United States Patent Office 2,716,656
Patented Aug. 30, 1955

---

2,716,656

ORGANO TITANIUM-SILICON COPOLYMER PREPARATION

Thomas Boyd, Springfield, Mass., assignor to Monsanto Chemical Company, St. Louis, Mo., a corporation of Delaware No Drawing. Application January 21, 1953,
Serial No. 332,529

5 Claims. (Cl. 260—429)

This invention relates to copolymers of organic derivatives of silicon and titanium and to a process for preparing them.

This application is a continuation in part of application S. N. 151,819, filed March 24, 1950, now abandoned.

The silicone resin industry is built around the preparation of organic derivatives of silicon and polymers thereof. The silicone resins have been found extremely useful in a great many different fields. Attempts have been made to incoroprate the silicones into polymers of carbon compounds in order to take advantage of the properties peculiar to the silicones which are lacking in the carbon polymers. For the most part these attempts have been thwarted by lack of compatibility of the silicone polymers with the carbon polymers.

One object of this invention is to provide new copolymers of titanium and silicon organic derivatives.

A further object is to provide a process for copolymerizing organic derivatives of silicon with organic derivatives of titanium.

Another object is to provide silico-titanium copolymers having improved compatibility with organic polymers.

These and other objects are attained by copolymerizing organic derivatives of titanium with organic derivatives of silicon.

The following examples are given in illustration and are not intended to limit the scope of this invention. Where parts are mentioned they are parts by weight.

*Example I*

A solution is prepared by adding 380 parts (about 0.8 mol) of tetrabutyl orthotitanate monomer and 60 parts (about 0.2 mol) of dibutoxy dibutyl silane monomer to 1,000 parts of anhydrous benzene (about 12 mols). The solution is then heated to reflux temperature at atmospheric pressure and 0.75 mol of water dissolved in 300 parts of anhydrous butanol is added dropwise over a period of about four hours accompanied by vigorous agitation. The reaction is continued under refluxing conditions for about 2 hours after the last addition of the water-butanol solution. Butanol and benzene are then removed by distillation at reduced pressure to obtain a thick viscous clear liquid which is a copolymer of the tetrabutyl orthotitanate and the dibutoxy dibutyl silane.

*Example II*

A copolymer is prepared by reacting 525 parts (about 0.7 mol) of titanium tetraphthalate with 90 parts (about 0.3 mol) of dibutoxy dibutyl silane in anhydrous butanol solution. The reaction is carried out under constant agitation at reflux temperature and atmospheric pressure with the dropwise addition of a solution of 0.8 mol of water in 300 parts of anhydrous butanol. After all of the water is added the reaction is continued at reflux temperature for about 2 hours and then the butanol is removed by vacuum distillation. The product is an extremely viscous clear copolymer of the titanium tetraphthalate and the dibutoxy dibutyl silane.

*Example III*

Example II is repeated except that the titanium tetraphthalate is replaced by a molecular equivalent amount of the tetrabutyl amide of orthotitanic acid. A viscous slightly yellow copolymer is obtained.

*Example IV*

A copolymer is prepared by reacting 380 parts (about 0.8 mol) of tetrabutyl orthotitanate with 70 parts (about 0.2 mol) of tetrabutoxy silane in anhydrous butanol. The reaction is carried out under agitation at reflux temperature and atmospheric pressure with the addition of 0.9 mol of water dissolved in anhydrous butanol slowly over a period of about two hours. The reaction is continued for about 1 hour after the last addition of the water and then the butanol is removed by vacuum distillation. The product is a clear liquid copolymer.

The titanium compounds which may be used in the preparation of the copolymers are tetra organo derivatives of orthotitanic acid. The organic part of the compound may be alkyl, aralkyl, aryl, acyl, amido, etc. If tetraalkyl orthotitanates are used they may be derived from monohydric saturated or unsaturated alcohols such as methanol, ethanol, butanol, lauryl alcohol, etc., allyl alcohol, oleyl alcohol, etc. Tetrabenzyl, tetraphenyl, tetranaphthyl, tetracresyl, tetracinnamyl, etc., aryl and aralkyl orthotitanates may also be used. The acyl derivatives of orthotitanic acid are exemplified by the titanium tetraphthalate of Example II. They may be prepared from other aromatic acids and from aliphatic and cyclic acids which contain one or more carboxyl groups. Among the acids which may be used are acetic, butyric, valeric, stearic, acrylic, atropic, maleic, fumaric, benzoic, cinnamic, furoic, etc., acids. The amides of orthotitanic acids are exemplified by the tetrabutyl amide of Example III. Other amides may be used such as the ethyl, propyl, pentyl, octyl, stearyl, oleyl, phenyl, naphthyl, etc., amides of orthotitanic acid.

The titanium compounds may be further described as the tetra-esters, tetra-amides and tetra-anhydrides of orthotitanic acid. The tetra-esters have the formula $Ti(OR)_4$ wherein R is a monovalent hydrocarbon radical. The hydrocarbon radical may be saturated or unsaturated and it may be acyclic, cyclic or aromatic.

The tetra-anhydrides have the formula

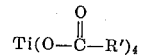

wherein R' is an alkyl, cyclic or acyclic radical or an aryl radical. The tetra-amides have the formula

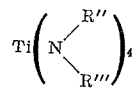

wherein R" is hydrogen, alkyl or aryl and R''' is alkyl or aryl. The alkyl radicals in the amides and anhydrides may be cyclic or acyclic and saturated or unsaturated.

Titanium monomers containing ester and anhydride groups, ester and amide groups or amide and anhydride groups may be obtained by reaction of a tetra substituted monomer of one of these classifications with an alcohol, acid or amide under anhydrous conditions. These mixed monomers will also form copolymers with the silicon derivatives under the conditions of this reaction.

The silicon compounds which may be used have the formula $Si(OR)_nR_{(4-n)}$ wherein each R is a monovalent hydrocarbon radical and $n$ is an integer from 1 to 4 inclusive. All of the R's may be the same or they may be different. The hydrocarbon radicals may be cyclic or acyclic, saturated, unsaturated, aliphatic or aromatic and include the alkyl, aryl, alkenyl, aralkyl, aralkenyl, alkenaryl, cycloalkyl, cycloalkenyl and heterocyclic radicals such as methyl, ethyl, propyl, butyl, isobutyl, secondary butyl, tertiary butyl, amyl, hexyl, vinyl, allyl, chlorallyl, methallyl, crotyl, butadienyl, phenyl, dichlorophenyl, pentachlorophenyl, xylyl, benzyl, styryl, cinnamyl, furfuryl, pyridyl, cyclohexyl, cyclopentadienyl, etc., radicals. However, the saturated hydrocarbon radicals are generally preferred.

The preparation of the copolymers is carried out in an anhydrous solvent such as anhydrous alcohols, anhydrous aliphatic hydrocarbons or anhydrous aromatic hydrocarbons. Preferably the solvent should have a relatively low boiling point so that it may be removed from the reaction product without heating to over 200° C. It is frequently desirable to conduct the distillation under vacuum to remove the solvent.

The copolymerization reaction is dependent upon the amount of water added. The water should be added slowly to a solution of the monomers. The entire amount of water should not be mixed with the entire amount of comonomers at one time and the mixing should be accompanied by constant agitation. The reaction is preferably carried out by dissolving the mixture of monomers in an organic solvent, adding the required amount of water to a relatively large amount of the same or a different solvent in which the water is at least partially soluble and thereafter adding the dilute solution of water in organic solvent to the monomer solution. The amount of water may be varied from 0.5 mol to 1.5 mols per mol of monomer mixture.

The copolymers range from liquids to hard solids depending on the particular monomers and the amount of water used. In general, if 0.5 mol of water is used, the products are quite low in molecular weight. As more water is used, the molecular weight and the number of titanium and silicon units in the copolymer rises with the production of long chain polymeric materials which are increasingly viscous. When the amount of water is from 1 to 1.5 mols, substantial crosslinking occurs and the majority of the products are solids.

The copolymers of this invention are useful as curing catalysts for condensation resins such as urea-, phenol-, and melamine-aldehyde resins. They tend to speed up the cure of said resins and produce a tougher product especially when used in film forming compositions. The copolymers are particularly advantageous for treating textile fabrics to render them water-repellent. The repellency is nearly 100% even when the fabric is immersed in water for 24 hours or more and it is resistant to repeated laundering or dry-cleaning.

It is obvious that many variations may be made in the products and processes of this invention without departing from the spirit and scope thereof as defined by the appended claims.

What is claimed is:

1. A process for copolymerizing monomeric tetraorgano derivatives of orthotitanic acid with monomeric organo silicon derivatives which comprises slowly adding with agitation to an anhydrous organic solvent solution of a mixture of said titanium and silicon monomers a mixture of water with an excess of an organic solvent capable of at least partially dissolving the water, said water-solvent mixture containing from 0.5 to 1.5 mols of water per mol of said monomer mixture, said silicon monomer having the formula $Si(OR)_nR_{(4-n)}$ wherein each R is a monovalent hydrocarbon radical and $n$ is an integer of 1 to 4 inclusive, said titanium monomer being taken from the group consisting of tetra-esters, tetra-anhydrides and tetra-amides of orthotitanic acid, said tetraesters having the formula $Ti(OR)_4$ wherein R is a monovalent hydrocarbon radical, said tetra-anhydrides having the formula

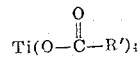

wherein R' is taken from the group consisting of alkyl and aryl radicals and said tetra-amides having the formula

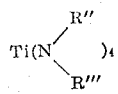

wherein R'' is taken from the group consisting of hydrogen and alkyl and aryl radicals and R''' is taken from the group consisting of alkyl and aryl radicals.

2. A process as in claim 1 wherein the titanium monomer is a tetra-ester of orthotitanic acid.

3. A process as in claim 1 wherein the titanium monomer is a tetra-anhydride of orthotitanic acid.

4. A process as in claim 1 wherein the titanium monomer is a tetra-amide of orthotitanic acid.

5. A process for copolymerizing monomeric tetrabutyl orthotitanate with dibutyl dibutoxy silane which comprises slowly adding with agitation to an anhydrous organic solvent solution of a mixture of said monomers a mixture of water with an excess of an organic solvent capable of at least partially dissolving the water, said water-solvent mixture containing from 0.5 to 1.5 mols of water per mol of monomer mixture.

References Cited in the file of this patent

UNITED STATES PATENTS 2,512,058      Gulledge _____ Jan. 20, 1950